US012381353B2

(12) United States Patent
Lu et al.

(10) Patent No.: US 12,381,353 B2
(45) Date of Patent: Aug. 5, 2025

(54) BUSHING WELL EXTENDER

(71) Applicant: CHARDON TAIWAN CORPORATION, Miaoli County (TW)

(72) Inventors: Po-Hung Lu, Miaoli County (TW); Pei-Fu Liao, Miaoli County (TW)

(73) Assignee: CHARDON TAIWAN CORPORATION, Miaoli County (TW)

( * ) Notice: Subject to any disclaimer, the term of this patent is extended or adjusted under 35 U.S.C. 154(b) by 313 days.

(21) Appl. No.: 18/330,831

(22) Filed: Jun. 7, 2023

(65) Prior Publication Data

US 2024/0372292 A1 Nov. 7, 2024

(30) Foreign Application Priority Data

May 5, 2023 (TW) ................................ 112116686

(51) Int. Cl.

*H01R 13/53* (2006.01)
*H01R 13/58* (2006.01)
*H01R 24/20* (2011.01)

(52) U.S. Cl.

CPC ......... *H01R 13/53* (2013.01); *H01R 13/5804* (2013.01); *H01R 24/20* (2013.01)

(58) Field of Classification Search

CPC .... H01R 13/53; H01R 13/5804; H01R 24/20; H01R 31/065

See application file for complete search history.

(56) References Cited

U.S. PATENT DOCUMENTS

| | | | | | |
|---|---|---|---|---|---|
| 3,883,208 | A * | 5/1975 | Sankey | H01R 13/53 | 439/889 |
| 4,202,591 | A * | 5/1980 | Borgstrom | H01R 13/53 | 439/185 |
| 4,722,694 | A * | 2/1988 | Makal | H01R 13/53 | 439/279 |
| 4,799,895 | A * | 1/1989 | Borgstrom | H01R 13/53 | 439/805 |
| 7,381,103 | B2 * | 6/2008 | Luzzi | H01R 13/53 | 439/801 |
| 8,602,800 | B2 * | 12/2013 | Borgstrom | H01R 13/53 | 439/181 |

* cited by examiner

*Primary Examiner* — Travis S Chambers

(74) *Attorney, Agent, or Firm* — Sinorica International Patent & Trademark

(57) ABSTRACT

A bushing well extender includes a body. The body includes a plug and a socket on two ends thereof and an extension portion extending from a peripheral side of the body. The extension portion has a chamber therein. A first electrically-conductive member is provided between the plug and the socket. A second electrically-conductive member is provided between the first electrically-conductive member and the chamber of the extension portion. When the bushing well extender is to be used, the operator selects a corresponding workpiece according to the function to be expanded and puts the workpiece into the chamber. Then, the body is connected in series with a high-voltage circuit, so that the high-voltage circuit has the function of the workpiece.

8 Claims, 6 Drawing Sheets

BUSHING WELL EXTENDER

FIELD OF THE INVENTION

The present invention relates to a bushing well, and more particularly to a bushing well extender.

BACKGROUND OF THE INVENTION

In general, high-voltage electrical equipment usually has multiple high-voltage circuits. The high-voltage electric circuits are connected to one another through a bushing well and at least one bushing insert. The operator may insert the bushing insert into the bushing well or pull out the bushing inert from the bushing well, which is convenient for operation and maintenance.

However, the high-voltage electrical equipment usually adopts a closed-loop design. When the high-voltage electrical equipment needs an additional function, for example, when the high-voltage electrical equipment needs the function of an arrester in order to protect the high-voltage electrical equipment from being damaged by lightning, it is required to add an additional high-voltage circuit having an arrester. This is time-consuming and costly.

SUMMARY OF THE INVENTION

The primary object of the present invention is to provide a bushing well extender, which can be connected in series with a high-voltage circuit simply and quickly to expand the function of the high-voltage circuit.

In order to achieve the aforesaid object, the bushing well extender comprises a body and an electrically-conductive unit in the body. The body includes a plug and a socket on two ends thereof and an extension portion extending from a peripheral side of the body. The electrically-conductive unit includes a first electrically-conductive member connected to the plug and the socket and a second electrically-conductive member connected to the first electrically-conductive member and the extension portion. One end of the plug is recessed to form a groove. A bottom of the socket has a protrusion corresponding to the groove. A communication hole is defined in the protrusion. The communication hole communicates with the groove. The first electrically-conductive member is disposed in the communication hole. One end of the first electrically-conductive member, corresponding to the plug, has a connecting hole. One end of the first electrically-conductive member, corresponding to the socket, has a connecting post. The extension portion has a chamber therein. A passage is connected between the chamber and the socket. The second electrically-conductive member is disposed in the passage. One end of the second electrically-conductive member, corresponding to the socket, has a connecting portion. The connecting portion is electrically connected to the first electrically-conductive member. One end of the second electrically-conductive member, corresponding to the chamber, has an electrically-conductive portion. An auxiliary material of a semi-conductive material is provided between the second electrically-conductive member and an inner wall of the passage.

When the bushing well extender provided by the present invention is to be used, the operator selects a corresponding workpiece, such as an arrester module, according to the function to be expanded. The operator puts the workpiece into the chamber of the extension portion to be electrically connected to the electrically-conductive portion. Then, the body is connected in series between a bushing well and a bushing insert of a high-voltage circuit, so that the high-voltage circuit has the function of the workpiece. Thereby, the function of the high-voltage circuit can be expanded simply and quickly.

DETAILED DESCRIPTION OF THE PREFERRED EMBODIMENTS

Embodiments of the present invention will now be described, by way of example only, with reference to the accompanying drawings.

Figure 1:
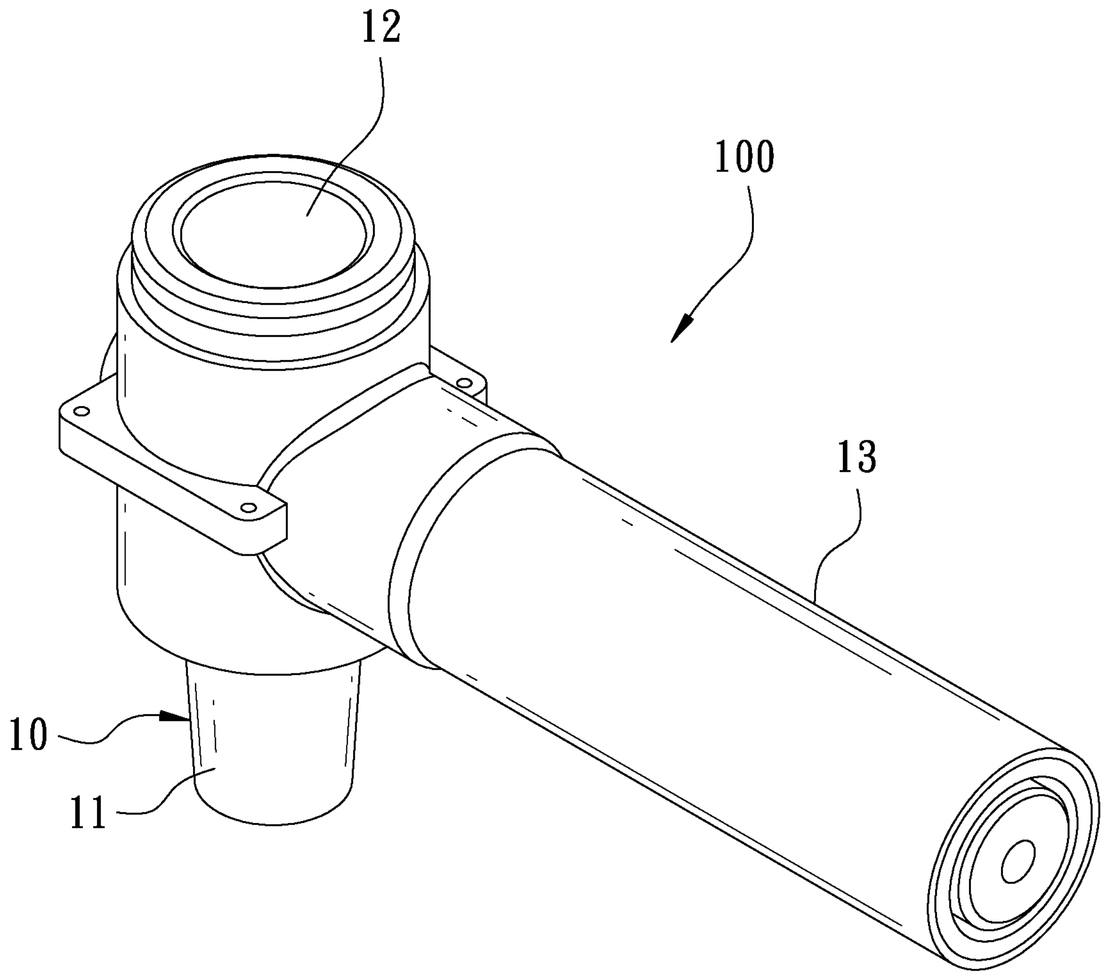
FIG. 1 is a perspective view in accordance with a first embodiment of the present invention.
Figure 2:
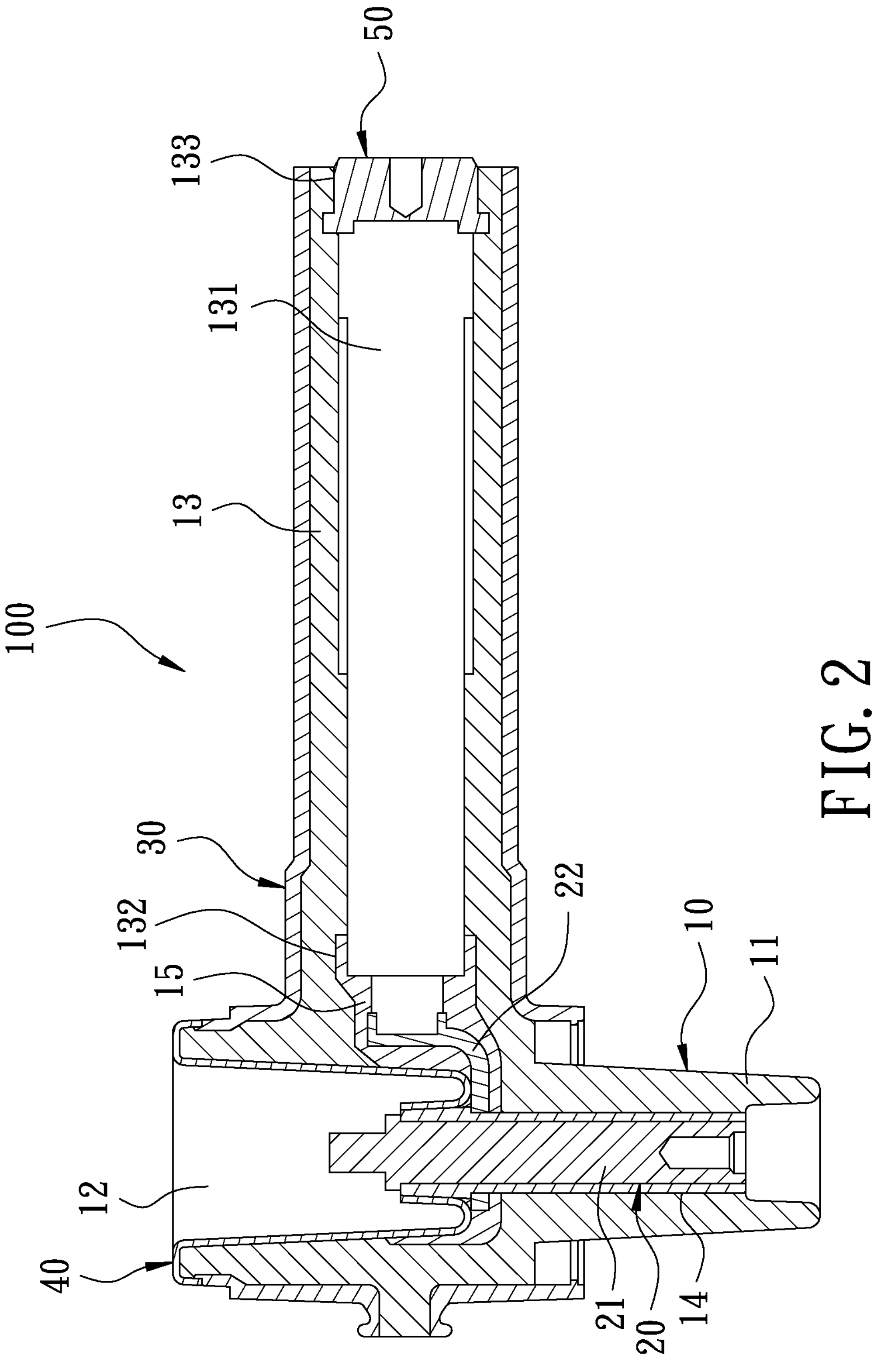
FIG. 2 is an exploded view in accordance with the first embodiment of the present invention.

FIG. 1 is a perspective view in accordance with a first embodiment of the present invention. FIG. 2 is an exploded view in accordance with the first embodiment of the present invention. The present invention discloses a bushing well extender 100. The bushing well extender 100 comprises a body 10. The body 10 is made of insulating rubber. The body 10 includes a plug 11 extending from one end of the body 10, a socket 12 defined in the other end of the body 10, and an extension portion 13 extending from the peripheral side of the body 10. The extension portion 13 has a chamber 131 therein. An electrically-conductive unit 20 is provided in the body 10. The electrically-conductive unit 20 is made of metal. The electrically-conductive unit 20 includes a first electrically-conductive member 21 connected between the plug 11 and the socket 12 and a second electrically-conductive member 22 connected to the first electrically-conductive member 21 and the chamber 131 of the extension portion 13.

Figure 3:
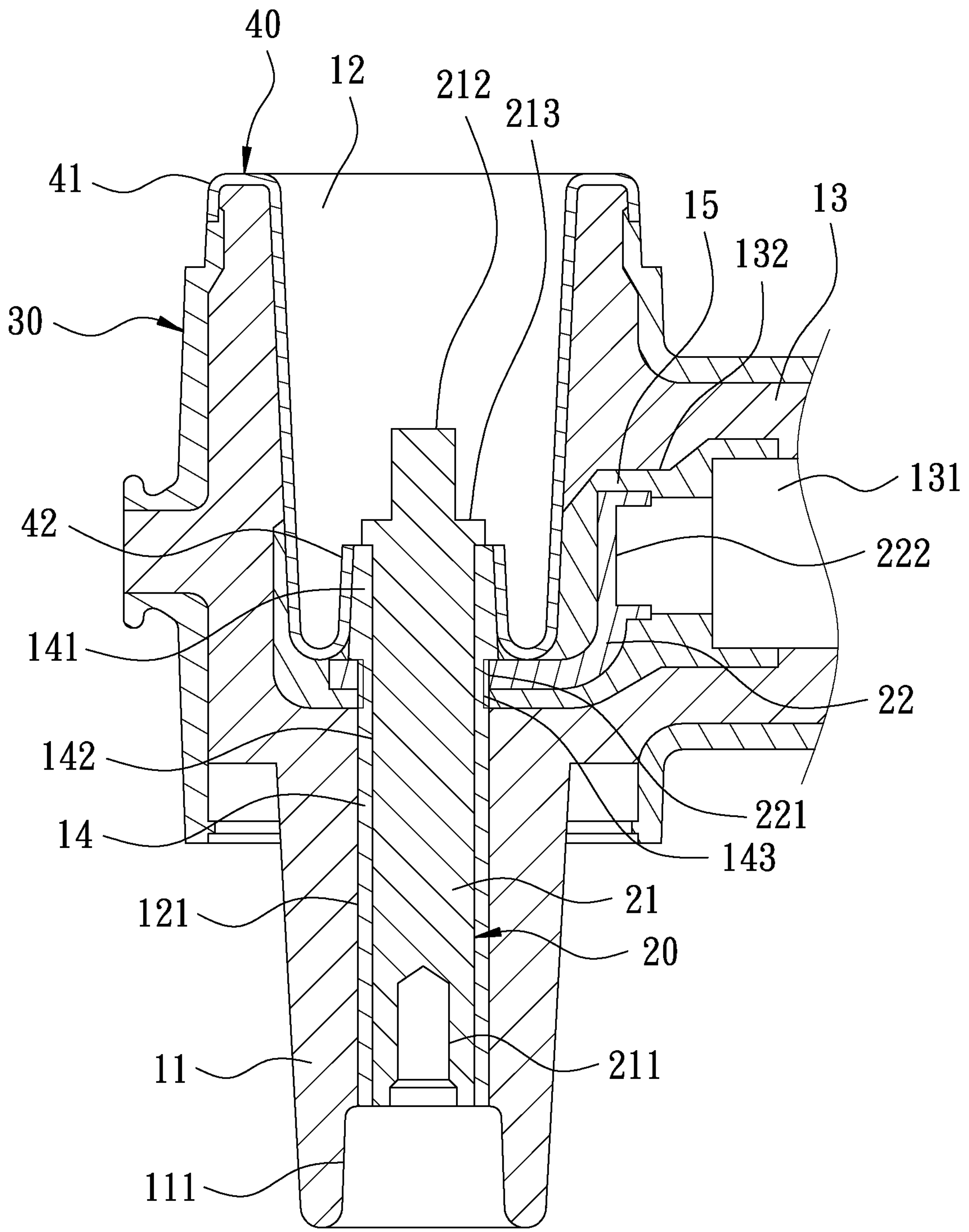
FIG. 3 is a partial, enlarged cross-sectional view in accordance with the first embodiment of the present invention.

FIG. 3 is a partial, enlarged cross-sectional view in accordance with the first embodiment of the present invention. As shown in FIG. 3, the end of the plug 11 is recessed to form a groove 111. The bottom of the socket 12 is formed with a perforation 121 communicating with the groove 111. An electrically-conductive bushing 14 is provided in the perforation 121. The electrically-conductive sleeve 141 is made of metal. One end of the electrically-conductive bushing 14, corresponding to the socket 12, extends out of the perforation 121 and forms a protrusion 141. A communication hole 142 is defined in the protrusion 141. The communication hole 142 communicates with the groove 111. The first electrically-conductive member 21 is arranged in the communication hole 142. One end of the first electrically-conductive member 21, corresponding to the plug 11, has a connecting hole 211. One end of the first electrically-conductive member 21, corresponding to the socket 12, has a connecting post 212 and a flange 213 adjacent to the peripheral side of the connecting post 212. The flange 213 is in contact with the end face of the electrically-conductive bushing 14. Because the body 10 is made of rubber, when the body 10 is manufactured, the electrically-conductive bushing 14 is helpful to form the communication hole 142 for the first electrically-conductive member 21 to pass through the communication hole 142. But, this is only a preferred implementation. For those skilled in the art, the protrusion 141 and the communication hole 142 may be integrally formed with the body 10, without the electrically-conductive bushing 14.

Referring to FIG. 3, a passage 132 is connected between the chamber 131 of the extension portion 13 and the socket 12. The second electrically-conductive member 22 is arranged in the passage 132. One end of the second electrically-conductive member 22, corresponding to the socket 12, has a connecting portion 221. The connecting portion 221 is electrically connected to the first electrically-conductive member 21. In this embodiment, a threaded portion 143 is provided on the peripheral side of the electrically-conductive bushing 14, and the connecting portion 221 is a threaded hole for connection of the threaded portion 143 of the electrically-conductive bushing 14, such that the second electrically-conductive member 22 is electrically connected to the first electrically-conductive member 21 through the electrically-conductive bushing 14. In addition, one end of the second electrically-conductive member 22, corresponding to the chamber 131, has an electrically-conductive portion 222. An auxiliary material 15 of a semi-conductive material, such as semi-conductive rubber, is provided between the second electrically-conductive member 22 and the inner wall of the passage 132, so as to provide uniform electric field and reduce electric field stress in a high electric field environment.

Referring to FIG. 2 and FIG. 3, the bushing well extender 100 further comprises an outer casing 30 and an inner casing 40. The outer casing 30 is disposed on the outer surface of the body 10. The inner casing 40 is disposed on the inner wall of the socket 12. One side of the inner casing 40 is bent and extended to form a first extension segment 41. The first extension segment 41 is arranged around the opening of the socket 12. Another side of the inner casing 40 is bent and extended to form a second extension segment 42. The second extension segment 42 is arranged around the peripheral side of the protrusion 141, so that the rigidity of the socket 12 is improved through the inner casing 40. Further, the extension portion 13 has an opening 133 communicating with the chamber 131, and a cover 50 is provided to cover the opening 133.

Figure 4:
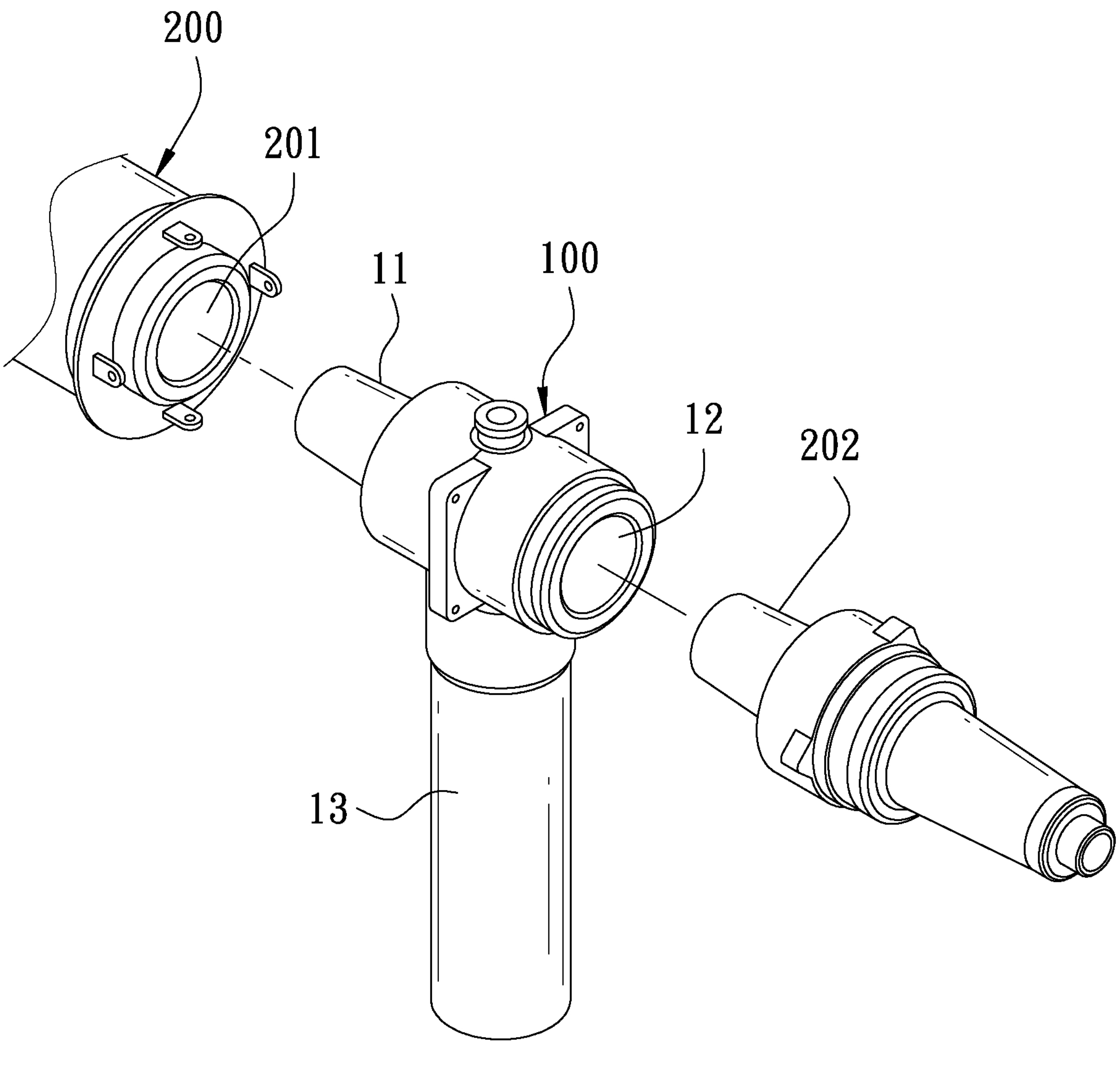
FIG. 4 is a schematic exploded view in accordance with the first embodiment of the present invention when in use.
Figure 5:
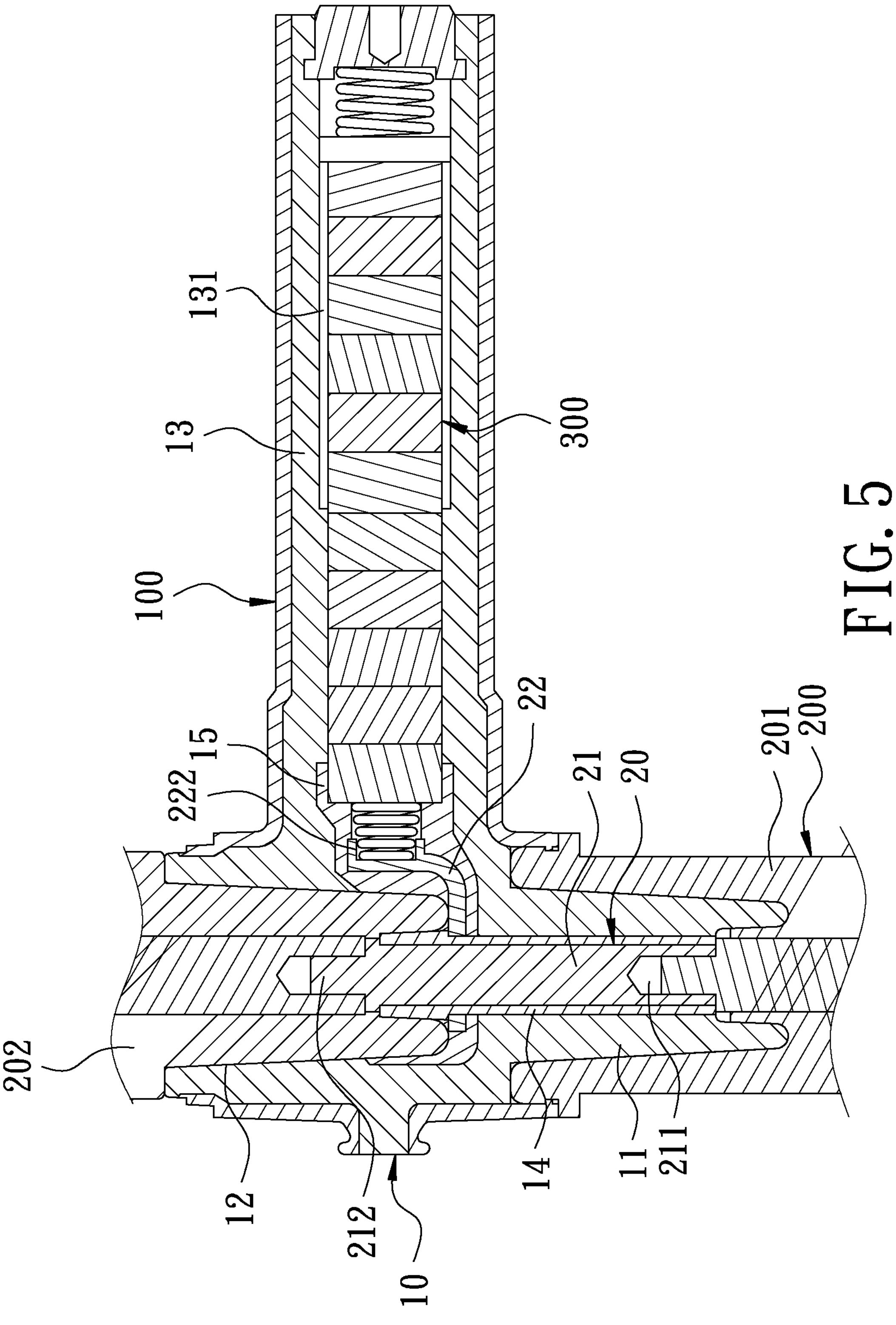
FIG. 5 is a schematic cross-sectional view in accordance with the first embodiment of the present invention when in use.

FIG. 4 is a schematic exploded view in accordance with the first embodiment of the present invention when in use. FIG. 5 is a schematic cross-sectional view in accordance with the first embodiment of the present invention when in use. Referring to FIG. 4 and FIG. 5, the bushing well extender 100 may be connected in series with a high voltage circuit 200 to expand the function of the high voltage circuit 200. The high-voltage circuit 200 includes a bushing well 201 and a bushing insert 202 that can be connected to each other. When the bushing well extender 100 is to be used, the operator selects a corresponding workpiece 300 according to the function to be expanded, such as an arrester module, a ZnO block or a sensor. Taking the workpiece in the form of an arrester as an example, the operator puts the workpiece 300 in the form of an arrester module into the chamber 131 of the extension portion 13, and the workpiece 300 is electrically connected to the electrically-conductive portion 222 of the second electrically-conductive portion 22. After that, the plug 11 is inserted into the bushing well 201 and electrically connected to the bushing well 201 via the connecting hole 211. Then, the bushing insert 202 is inserted into the socket 12 and electrically connected to the connecting post 212. The connecting hole 211 is a threaded hole, and the connecting post 212 is a threaded post. They are threadedly connected for electrical connection, which is a conventional technology so it will not be repeated hereinafter. In this way, the bushing well 201 and the bushing insert 202 are electrically connected to each other through the first electrically-conductive member 21, and can be electrically connected to the workpiece 300 through the second electrically-conductive member 22. Thus, the function of the high voltage circuit 200 can be expanded easily and quickly through the bushing well extender 100.

Figure 6:
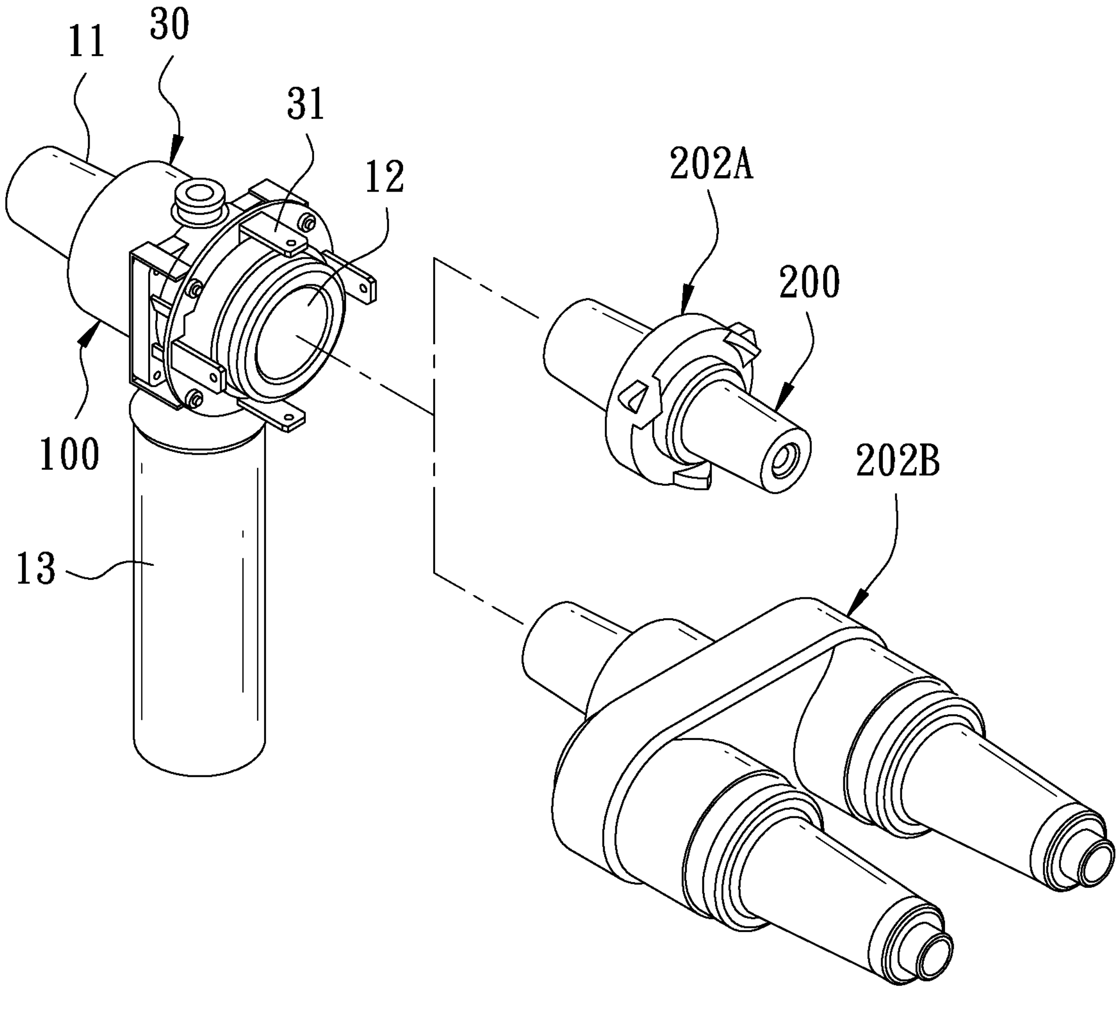
FIG. 6 is a schematic exploded view in accordance with a second embodiment of the present invention when in use.

FIG. 6 is a schematic exploded view in accordance with a second embodiment of the present invention when in use. As shown in FIG. 6, the bushing well extender 100 differs from the first embodiment in that the outer casing 30 has a coupling portion 31, such as a connecting iron frame. The coupling portion 31 is configured to connect the bushing insert 202. Thereby, the bushing well extender 100 may be connected to different types of bushing inserts 202 through the coupling portion 31, such as a deadbreak bushing insert 202A or a loadbreak feed-thru bushing insert 202B.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A bushing well extender, comprising:

a body, including a plug extending from one end of the body, a socket defined in another end of the body and an extension portion extending from a peripheral side of the body, one end of the plug being recessed to form a groove, a bottom of the socket having a protrusion corresponding to the groove, a communication hole being defined in the protrusion, the communication hole communicating with the groove, the extension portion having a chamber therein for accommodating a workpiece, a passage being connected between the chamber and the socket;

an electrically-conductive unit, including a first electrically-conductive member disposed in the communication hole and a second electrically-conductive member disposed in the passage, one end of the first electrically-conductive member, corresponding to the plug, having a connecting hole, one end of the first electrically-conductive member, corresponding to the socket, having a connecting post, one end of the second electrically-conductive member, corresponding to the socket, having a connecting portion, the connecting portion being electrically connected to the first electrically-conductive member, one end of the second electrically-conductive member, corresponding to the chamber, having an electrically-conductive portion, the electrically-conductive portion being electrically connected to the workpiece, an auxiliary material of a semi-conductive material being provided between the second electrically-conductive member and an inner wall of the passage.

2. The bushing well extender as claimed in claim 1, wherein the bottom of the socket of the body is formed with a perforation communicating with the groove, an electrically-conductive bushing is provided in the perforation, one end of the electrically-conductive bushing, corresponding to the socket, extends out of the perforation and forms the protrusion, the communication hole is defined in the electrically-conductive bushing for insertion of the first electrically-conductive member, and the connecting portion of the second electrically-conductive member is connected to the electrically-conductive bushing so that second electrically-conductive member is electrically connected to the first electrically-conductive member via the electrically-conductive bushing.

3. The bushing well extender as claimed in claim 2, wherein a threaded portion is provided on a peripheral side of the electrically-conductive bushing, and the connecting portion is a threaded hole for connection of the threaded portion of the electrically-conductive bushing.

4. The bushing well extender as claimed in claim 2, wherein the first electrically-conductive member further has a flange adjacent to a peripheral side of the connecting post, and the flange is in contact with an end face of the electrically-conductive bushing.

5. The bushing well extender as claimed in claim 1, further comprising an outer casing, wherein the outer casing is disposed on an outer surface of the body.

6. The bushing well extender as claimed in claim 5, wherein the outer casing has a coupling portion configured to connect a bushing insert.

7. The bushing well extender as claimed in claim 1, further comprising an inner casing, wherein the inner casing is disposed on an inner wall of the socket, one side of the inner casing is bent and extended to form a first extension segment, the first extension segment is arranged around an opening of the socket, another side of the inner casing is bent and extended to form a second extension segment, and the second extension segment is arranged around a peripheral side of the protrusion.

8. The bushing well extender as claimed in claim 1, wherein the extension portion has an opening communicating with the chamber, and a cover is provided to cover the opening.

* * * * *